(No Model.) 5 Sheets—Sheet 2.
C. WHITNEY.
GRAIN DELIVERER FOR SELF BINDERS.
No. 305,256. Patented Sept. 16, 1884.
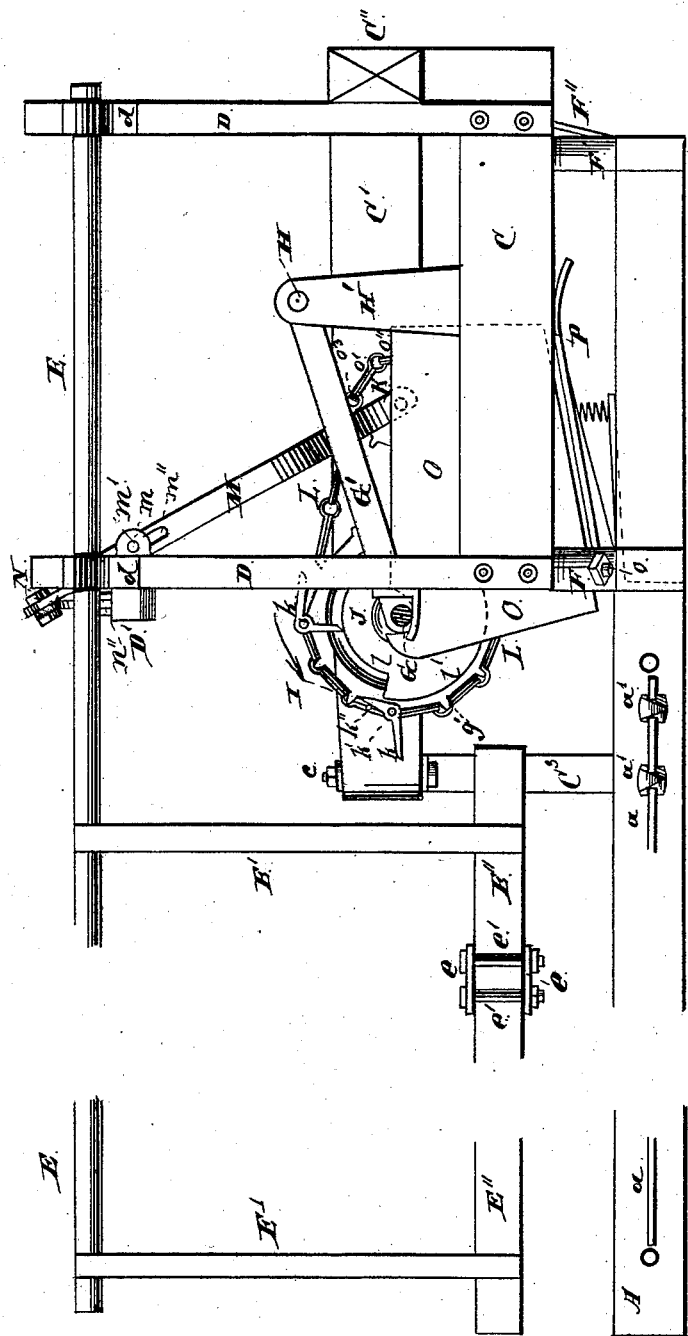

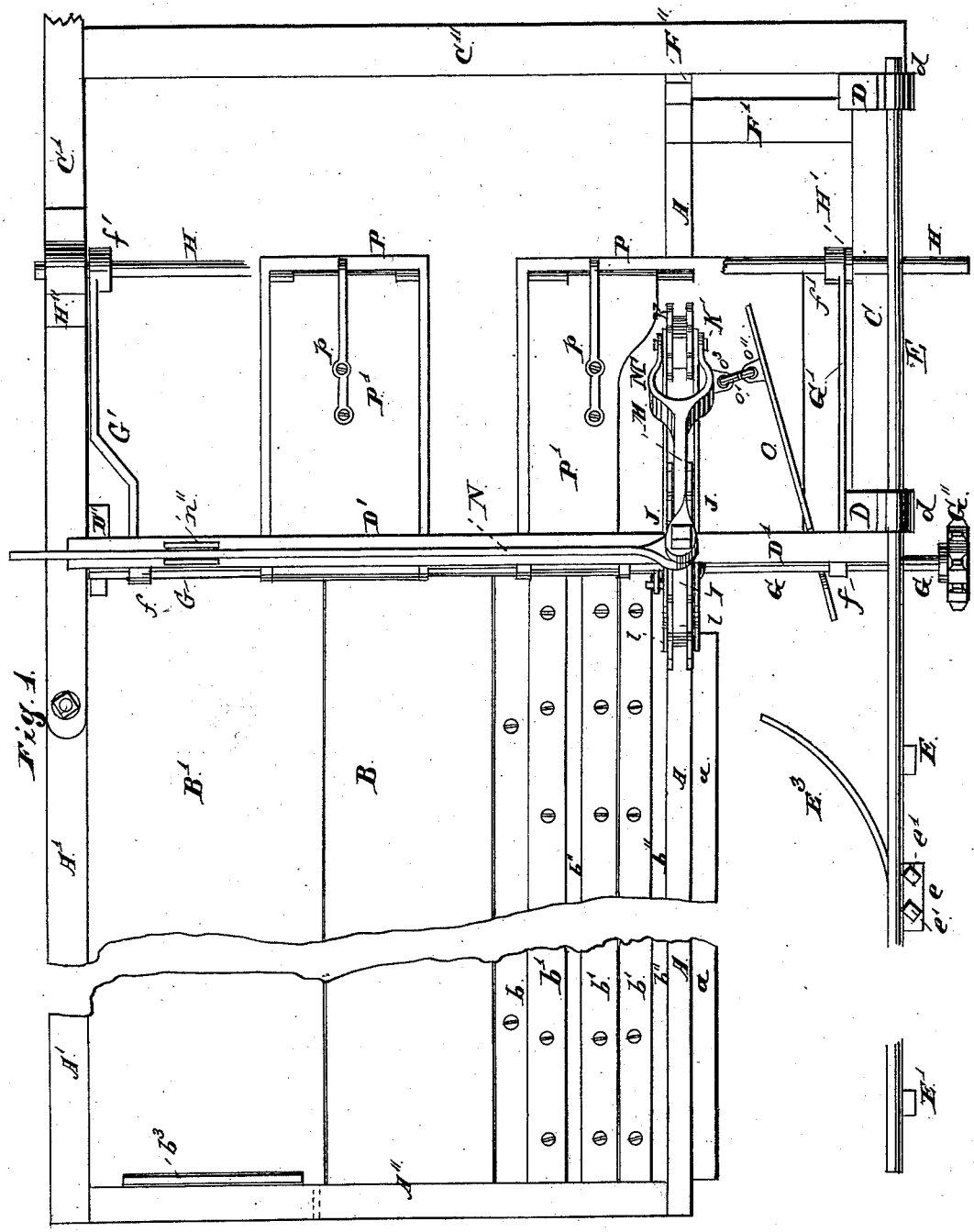

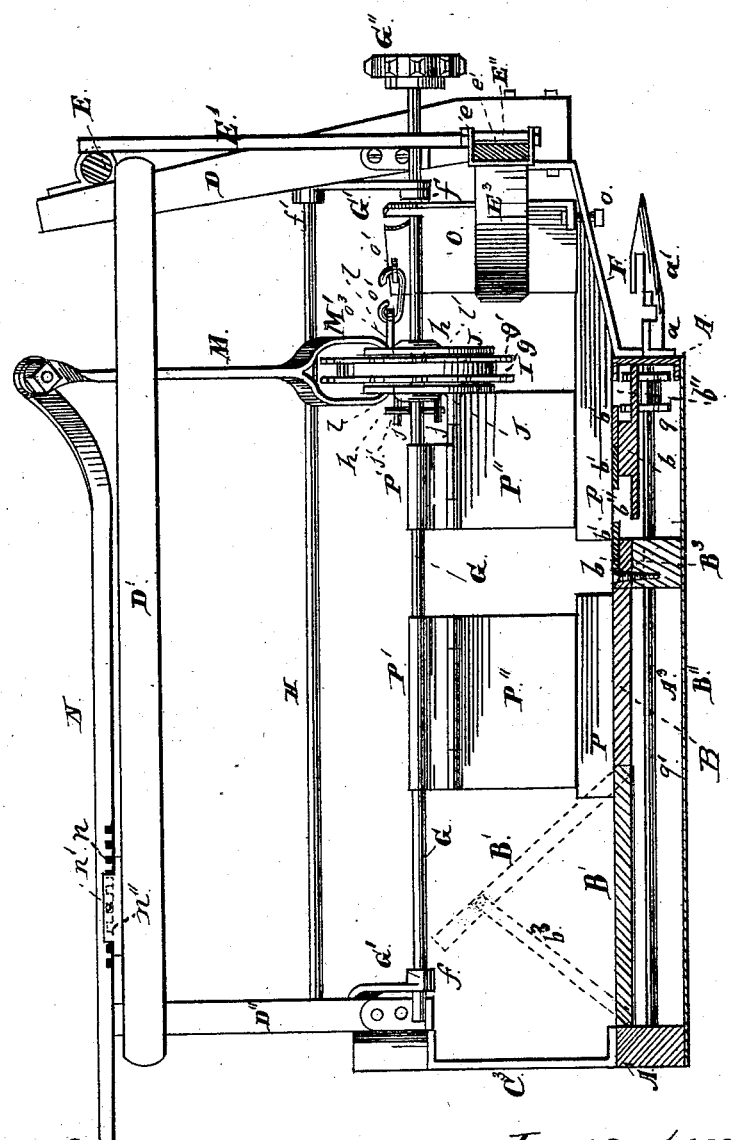

(No Model.)
5 Sheets—Sheet 4.
C. WHITNEY.
GRAIN DELIVERER FOR SELF BINDERS.
No. 305,256. Patented Sept. 16, 1884.
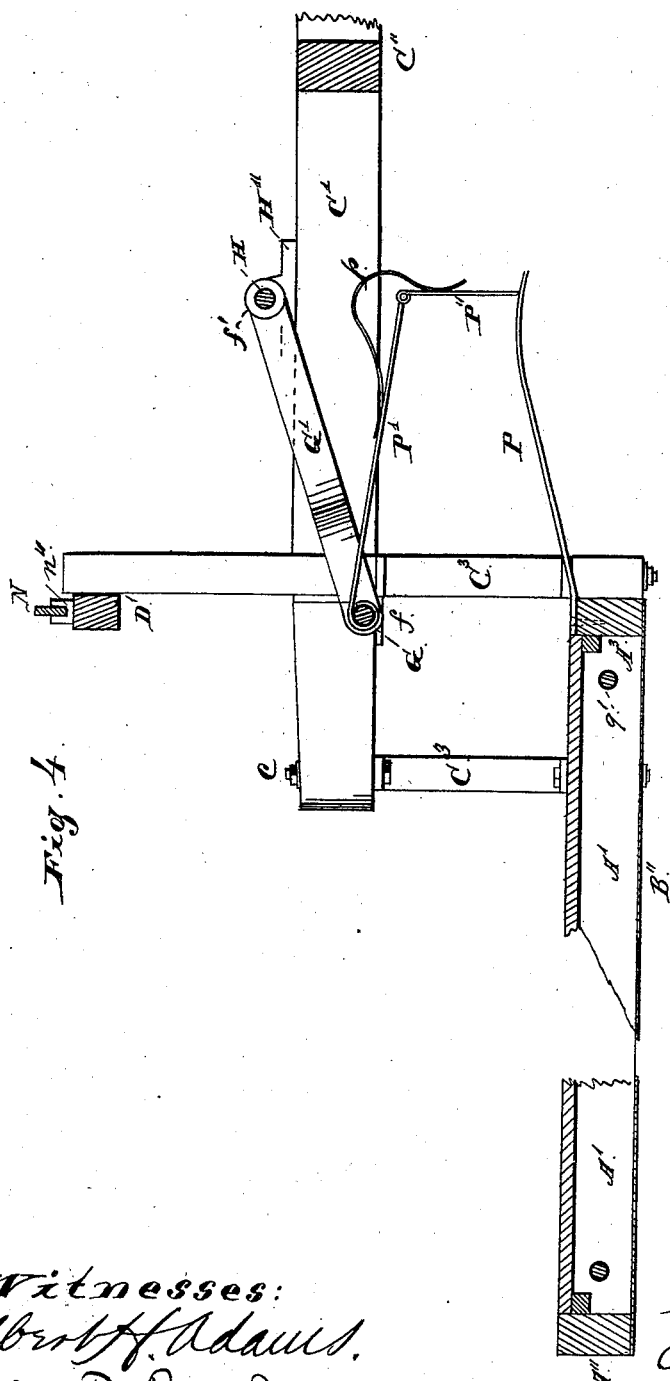
Witnesses:
Albert H. Adams.
Edgar S. Bond
Inventor:
Charles Whitney (No Model.) 5 Sheets—Sheet 5.
C. WHITNEY.
GRAIN DELIVERER FOR SELF BINDERS.
No. 305,256. Patented Sept. 16, 1884.
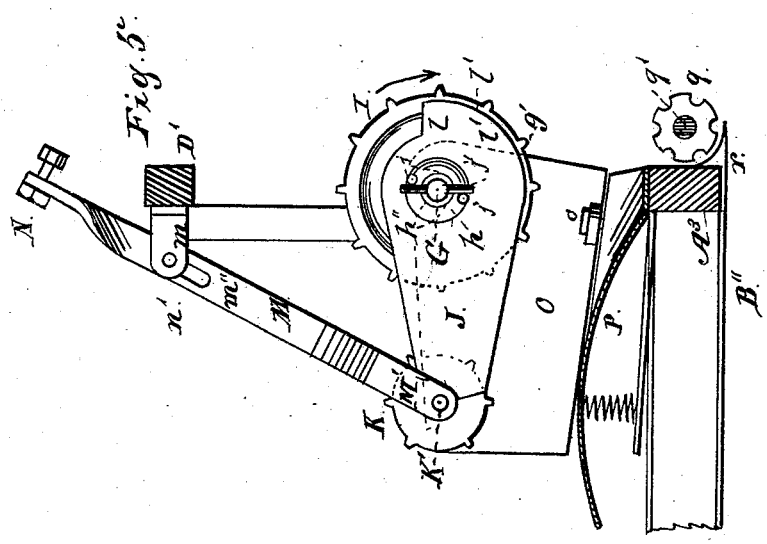
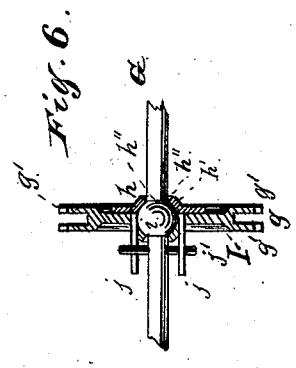
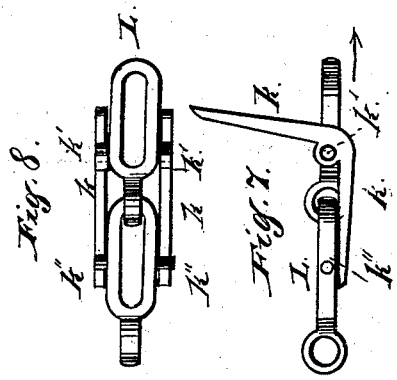
Witnesses:
Albert H. Adams.
Edgar S. Bond.
Inventor:
Charles Whitney.

UNITED STATES PATENT OFFICE.

CHARLES WHITNEY, OF SYCAMORE, ILLINOIS, ASSIGNOR TO HIMSELF, CHARLES W. MARSH AND WILLIAM W. MARSH, BOTH OF SAME PLACE, AND RALPH EMERSON AND WILLIAM A. TALCOTT, BOTH OF ROCKFORD, ILLINOIS.

GRAIN-DELIVERER FOR SELF-BINDERS.

SPECIFICATION forming part of Letters Patent No. 305,256, dated September 16, 1884.

Application filed November 13, 1882. (No model.)

*To all whom it may concern:*

Be it known that I, CHARLES WHITNEY, residing at Sycamore, in the county of DeKalb and State of Illinois, and a citizen of the United States, have invented new and useful Improvements in Grain-Delivery Devices for Self-Binding Harvesters, of which the following is a full description, reference being had to the accompanying drawings, in which—

Figure 1 is a plan view with the receiving-platform removed, and showing such devices as belong to this invention, the self-binder being omitted, and the frame-work, drive-wheel, and other devices not being fully shown; Fig. 2, a front elevation of the parts shown in Fig. 1; Fig. 3, an end elevation, with the platform in section; Fig. 4, a longitudinal vertical section showing the hinged or adjustable throat for the passage of the grain from the platform and the manner of suspending the shaft which carries the grain-adjusting devices. Fig. 5 is a detail rear elevation, partly in section, showing the opposite side of the grain-adjusting device from that shown in Fig. 2; Fig. 6, a detail, partly in section, showing the manner of attaching the main wheel of the grain-adjusting device to its shaft; and Figs. 7 and 8, details, being a rear side elevation and a plan view of a section of the grain-adjusting chains.

This invention relates to devices for delivering and adjusting the grain to a self-binder, or what are known as "low-down" or "platform" harvesters and binders; and the invention consists of the combination and arrangement of devices hereinafter described and claimed.

In the drawings, A represents the front sill or finger-beam of the platform. The platform has a rear sill, A', an outer end sill or divider, A", and an inner cross-sill, A³, as usual.

B is the front section of the platform, and B' the rear section. The rear section, B', is hinged at its front edge in any suitable manner to the rear edge of the section B, or is pivotally connected at its front end with the end sills, A" A³, so as to be free to have its rear edge raised or lowered, and it is held in its elevated position by a swinging catch, b³, attached to one end of the section near the rear edge, and having its free end arranged to engage with notches or other stops on the sill or divider A".

C is the front sill; C', the rear sill; C", the cross-sill, and C³ the standards, all forming the binder-frame, or a portion of such frame, the cross-sill C" being the sill between which and an outer sill (not shown) the drive-wheel is located.

D D are the reel-posts, extending up from the sill C to the proper height to support the shaft E of the reel.

D' is a cross-piece, supported at one end by one of the reel-posts and at its other end by a post, D", extending up from the rear sill C'.

F F' are braces or strengthening-bars extending from the front sill C to the front sill A, and F" is a brace or bar extending from the cross-piece C" to the outer end of the sill A. These braces or bars support the finger-beam against strain, and connect the platform-frame to the binder-frame at the front.

G is a shaft extending across the binder-frame, and supported so as to have a vertical movement by pivoted supporting-arms G'. This shaft has at its front end a sprocket or other wheel, G", by means of which power can be applied to rotate it.

H is a shaft extending across the binder-frame outside of the shaft G, and supported at one end in a standard, H', extending up from the front sill C, and at the other end in a suitable bearing, H", on the rear sill C'. The arms G', carrying the shaft G, swing from this shaft H as a pivot, and are held against movement on the shafts by collars $f f'$. The shaft H may be the main driving-shaft of the binder, or it may be an independent shaft. This shaft H and the shaft G are arranged in such a manner as to bring the grain-adjusting device, hereinafter described, which is carried and operated by the shaft G, in such a relation to the platform as to cause the proper action on the grain.

I is a sprocket-wheel, having its periphery provided with a groove, $g$, and teeth $g'$, so as to drive a toothed chain-carrier. This wheel I has a hub, $h$, with an interior ball-shaped cavity, $h'$, and with a transverse opening, $h''$, on each side for the passage of the shaft G, which openings $h''$ are outwardly flaring. The hub $h$ fits over a ball-shaped bearing, $i$, on the shaft G, forming therewith, essentially, a ball-and-socket joint, which permits the wheel to rock sidewise to the extent of the flaring openings $h''$ in the hub $h$. The wheel is locked to the shaft, so as to revolve therewith, by pins $j$, projecting out from the hub $h$ on one side, and interlocking with a cross-pin, $j$, which passes through the shaft G. This connection between the shaft and the wheel is one that does not interfere with the rocking or side movement of the wheel on the shaft.

J are side pieces or plates, one located on each side of the wheel I, and supported at its inner end on the hub $h$, so as not to interfere with the revolution of the wheel and the shaft G.

K is a small sprocket-wheel mounted on a shaft, K′, supported in the outer end of the plates J.

L is a chain running over the sprocket-wheels I K. This chain is made up of links adapted to be engaged by the teeth on the sprocket-wheel I, and be given a continuous travel around the sprocket-wheels. Attached to one or more links of this chain on each side is a tooth, $k$, consisting of an acting and a heel portion, as shown in Fig. 7, each tooth being pivoted to the link by a suitable pin, $k'$, projecting out from the side bar of the link. The movement of each tooth is limited by a pin, $k''$, extending out from the link next following that to which the teeth are pivoted. The manner of pivoting the teeth to the link and the stops to limit the movement of the teeth are shown in Figs. 7 and 8. The plates J form the track over which the teeth travel. For this purpose the upper edge of each plate at the inner end is cut away so as to form a shoulder, $l$, and from the shoulder $l$ around the remainder of the inner end each plate is formed on a circle concentric, or nearly so, with the wheel I, forming a face or guide, $l'$, against which the heel of the tooth will ride in passing around, thus holding the acting end of the tooth projected to engage the grain and carry it outward toward the binder. The teeth as they pass around the sprocket-wheel I have their heels brought into contact with the shoulder or stop $l$, which, with the forward movement of the wheel, projects their acting ends, and they are held in that position while the heel is engaged with the guide $l'$.

M is a bar, having at its lower end a fork, M′, which straddles the sprocket-wheel K and plates J, and receives the shaft K′, on which the wheel K is mounted. This bar M is guided near its upper end between ears $m$ by means of a pin or pivot, $m'$, passing through the ears and through a slot, $m''$, in the bar, by means of which slot the bar has a vertical play to the extent of the limit of the slot. The ears $m$ are attached to the cross-piece D′, and the upper end of the bar M extends above such cross-bar D′.

N is a bar, pivoted at its forward end to the upper end of the bar M, which bar it supports, and extending back over the cross-bar D′ to a point within reach of the driver when mounted on the machine. This bar or arm N has near its rear end a series of notches, $n$, which engage with a pin, $n'$, in a guide, $n''$, secured to the upper face of the cross-bar D′. This bar N is for the purpose of moving the arm M forward or back at its lower end to change the inclination of the wheel I, thereby changing the direction of travel of the chain L, thus changing the direction of flow of the grain and the point at which it is delivered. The notches $n$, with the pin $n'$, are for the purpose of holding the arm or bar M in whatever position it may be adjusted; but some other device could be used for this purpose.

O is a guide-board or butt-board located forward of the grain-adjusting device I J K L, and having its lower inner corner pivoted to the brace F by a bolt, $o$, which passes through an ear on the lower edge of the board. The outer end of this guide-board O is connected by a link, $o'$, with the bar M, the link passing through an ear, $o''$, on the board and an ear, $o'''$, on the arm, so as to make a flexible connection for the outer end of the board. This board, being connected at its outer end with the arm M, must move at that end with such arm or bar, the result being that the board has an inclination given it to correspond with the inclination of the carrier-chain L, and forms a guide for the butt-ends of the grain while the grain is being carried outward. By this arrangement the same movement which adjusts the butt-carrying devices also adjusts the guide-board.

P is a strip of sheet metal sufficiently thin to be somewhat yielding or to have a spring action, and forming the platform over which the grain is carried to the binder. This yielding platform is made in two parts, with a space between them for the passage of a binding-arm, and each section is provided with a cover or shield, P′, which is pivotally mounted on the shaft G and hangs outwardly from such shaft. It has on its free end a hinged flap or end piece, P″, which is held down, except when the bundle is discharged, by a spring, $p$, attached to the cover, and having its free end engaging the end of the flap. These covers are free to rise and fall, so as to adjust themselves to the quantity of grain, and they form floating covers, by which the grain is kept from flying and is held down. At the same time no impediment is offered to the free movement of the grain to the binder. The spring-hinged flaps or end pieces form a stop against the pressure of the grain until the bundle has been caught and bound and is ready to be discharged, when the action of the discharging-arms will overcome the resistance of the springs and allow the flaps to open and the bound bundle to pass through. The platform-chains are carried by sprocket-wheels $q$, located on a shaft, $q'$.

The operation will be understood from the foregoing description; but briefly it is as follows: The grain, as it is cut, falls upon the platform directly from the sickle, the reel operating to reel it back on the platform, as usual, and if the grain is thrown too far back the rear section, B', is elevated, causing the grain to slide forward for the action of the carrier-chains. As the grain reaches the inner end of the platform, the teeth k, as they are carried around by the chain L and sprocket-wheel I, will come in contact with the grain and carry it outward and over the platform P. The inclination of the chain L is adjusted by turning the wheel I on its ball center by means of the bars N and M, as before described, for the purpose of changing the direction of flow of the grain and the point at which it is delivered. For short grain the wheel I is set so that its inner edge is outward, or toward the finger-beam, while for long grain it is set with its inner edge inward, or away from the finger-beam, the result being that in the first instance the grain will be caught by the teeth and delivered farther to the rear of the binder-platform, while in the other instance the grain will be caught and delivered farther toward the front of the binder-platform. For medium grain the wheel is adjusted to run parallel with the platform. As the wheel is adjusted to suit the grain, the guide-board O will also be adjusted to assist in changing the direction of the flow of the grain and its proper delivery to the binder-platform. It will be noticed that the chain L has a length of travel nearly equal to the width of the platform P, the result being that the grain is kept under the action of the chain a much greater length of time than when packing-fingers or other forms of adjusters are used which have only a limited movement, and this great length of action on the grain will produce better results in straightening and delivering the grain than if such action were limited to a distance covered by the travel of the wheel I.

I have shown a finger-beam and guard-fingers connected in a peculiar manner; also, a platform and carrying-chains of peculiar construction, a curved finger on the reel-blade, and a guard for preventing the kinking of the carrier-chains; but no claims are here made to these features, as they will constitute the subject-matter of separate applications for Letters Patent.

Having thus described my invention, what I claim is—

1. The sprocket-wheel I, having a hub, h, with an interior ball-shaped cavity, h', and a transverse opening, h'', outwardly flaring at each end, in combination with the shaft G, having a ball, i, for mounting the wheel I on the shaft, to prevent end-play and permit free side movement, substantially as described.

2. The wheel I, having a hub or center, h, provided with an interior ball-shaped cavity, h', and transverse opening h'', outwardly flaring at the ends, in combination with the shaft G, having a ball, i, and interior locking-pins, j, for mounting the wheel on the shaft, so as to rotate therewith and allow the wheel to have a free side rocking movement, substantially as described.

3. The combination of the sprocket-wheel I, having a center or hub, h, provided with an interior ball-shaped cavity, h', and transverse opening h'', outwardly flaring at each end, and the shaft G, having a ball, i, with the chain L, having teeth on opposite sides of the chain, arranged in pairs, the teeth of each pair being in line, and a sprocket-wheel, K, for driving the chain in whatever position the wheel I may be placed, substantially as described.

4. The side rocking wheel, I, and chain L, having pivoted teeth k, arranged in pairs, one tooth on each side of the chain, the teeth of each pair being in line, in combination with the side plates, J, having cam ends for guiding and projecting the teeth and holding them projected in whatever position the wheel may be placed, substantially as described.

5. The side rocking wheel, I, the side plates, J J, having cam ends, the sprocket-wheel K, and chain L, having pivoted teeth k, arranged in pairs, one tooth on each side of the chain, the teeth of each pair being in line, in combination with the supporting-bar M and bar N, for changing the direction of travel of the chain, substantially as and for the purpose described.

6 The side rocking wheel, I, side plates, J J, having cam ends, the sprocket-wheel K, and chain L, having pivoted teeth k, forming a grain-adjusting device, in combination with a guide board or strip, O, against which the butt-ends of the grain ride, substantially as and for the purpose specified.

7. The side rocking wheel, I, side plates, J J, having cam ends, sprocket-wheel K, and chain L, having pivoted teeth k, arranged in pairs, one tooth on each side of the chain, the teeth of each pair being in line, forming a grain-adjusting device, in combination with a supporting-bar, M, guide board or strip O, and a connection between the bar M and board O, for changing the direction of the flow of the grain, and forming a guide for the butt-ends of the grain, substantially as and for the purposes specified.

8. The combination, substantially as herein described, of the spring or yielding platform, composed of two parts, separated by a space for the passage of a binding-arm, with a shaft, G, covers or shields P', pivoted to the shaft, flaps P'', hinged to one end of the covers or shields, and springs p, for holding the flaps down, except when the bundle is discharged.

9. The combination, substantially as herein described, of a platform, P, a shaft, G, located above the same, the covers or shields P', freely pivoted to the shaft and hanging outward therefrom, and the flaps P'', hinged to one end of the covers or shields, essentially as and for the purpose described.

CHARLES WHITNEY.

Witnesses:
O. W. BOND,
ALBERT H. ADAMS.